(No Model.)
A. EDWARDS.
PACKING AND SHIPPING FERTILIZERS.
No. 287,526. Patented Oct. 30, 1883.
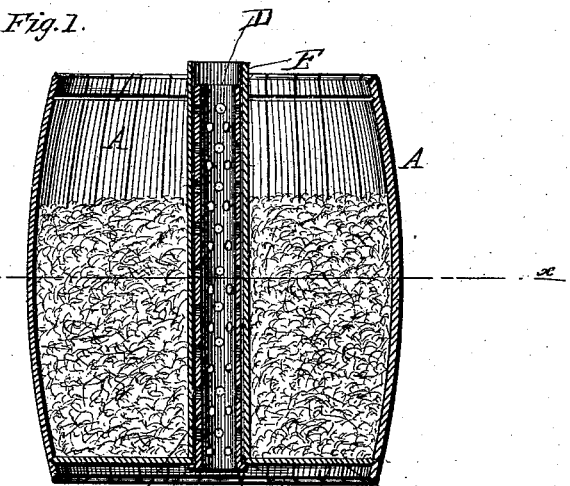
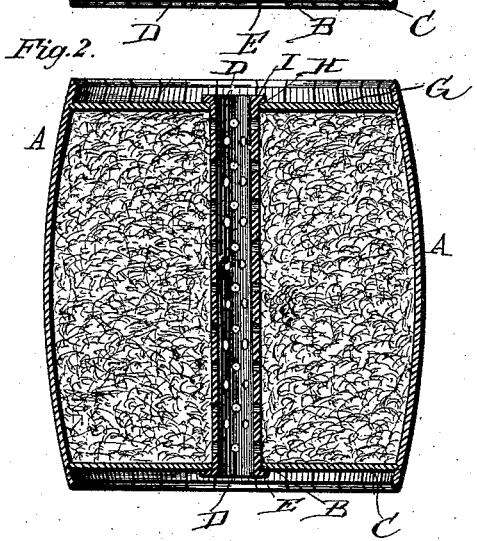
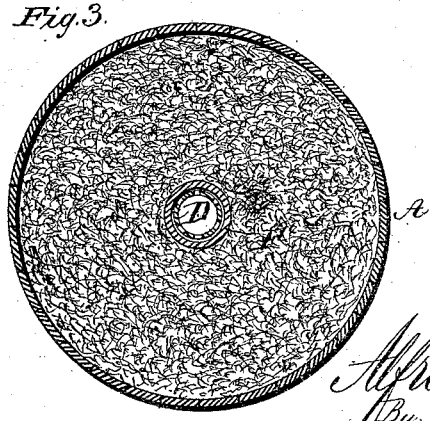
WITNESSES:
Alfred Edwards,
INVENTOR.
By Louis Bagger & Co.
ATTORNEYS

UNITED STATES PATENT OFFICE.

ALFRED EDWARDS, OF NEW HAVEN, CONNECTICUT, ASSIGNOR TO THE FARMERS PROTECTIVE UNION, OF LONG ISLAND CITY, NEW YORK.

PACKING AND SHIPPING FERTILIZERS.

SPECIFICATION forming part of Letters Patent No. 287,526, dated October 30, 1883.

Application filed April 3, 1883. (No model.)

*To all whom it may concern:*

Be it known that I, ALFRED EDWARDS, of New Haven, in the county of New Haven and State of Connecticut, have invented certain new and useful Improvements in Packing and Shipping Fertilizers; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of a receptacle for packing and shipping fertilizers, showing it partially filled by my improved method. Fig. 2 is a similar view of the same filled and ready for shipment, and Fig. 3 is a horizontal section on line $x$ $x$, Fig. 1.

Similar letters of reference indicate corresponding parts in all the figures.

My invention has relation to methods for packing and shipping fertilizers; and it consists in the improved method of packing the same in barrels or kegs, as hereinafter more fully described and claimed.

The object of my invention is to pack finely-comminuted fertilizers in such a manner for shipment, and especially for shipment to hotter climates, so that the gases created in the fertilizer by the heat and the moisture, which may possibly be in the fertilizer when packed, may escape, preventing heating of the same and the accidents following thereof; and to that end I pack the fertilizer in a barrel having an axial perforated tube passing through both heads of the barrel, as I will proceed to describe.

In the accompanying drawings, the letter A indicates the barrel, which has a central perforation, B, in the bottom, C, through which perforation a perforated sheet-metal tube, D, is passed, and fastened by means of turning the lower edge of the tube over the edge of the perforation, forming a flange, E, bearing against the outside of the bottom. When the barrel is to be filled, a tube, F, of a little larger diameter than the perforated tube, is placed over the said perforated tube, resting with its lower end upon the bottom of the barrel, and the fertilizer is filled into the barrel and packed firmly around the imperforate tube, the latter serving to prevent the pulverized fertilizer from filling the perforations in the perforated tube. When the barrel is filled to the top, the imperforate tube is withdrawn and the head placed in the barrel, which head, G, has a central perforation, H, through which the upper end of the perforated tube passes, and the upper edge of the said tube is turned over the edge of the perforation, forming a flange, I, which assists in keeping the head in place, while the gases and moisture arising in the fertilizer may escape through the perforations in the perforated tube, the perforations in which are small enough to prevent the particles of fertilizer to pass through them. In this manner it will be seen that the packages, which, if desired, may be of a different shape from a barrel, will be especially adapted to transport a fertilizer which has a tendency to ferment or to become hot without any danger of accident during transportation.

Having thus described my invention, I claim and desire to secure by Letters Patent of the United States—

The method of packing fertilizers in the ventilating-package, composed of the receptacle, the perforated heads, and the perforated sheet-metal tube, by fitting an imperforate tube upon the perforated tube, then packing and compacting the material closely around said imperforate tube, and finally withdrawing the same when the receptacle is full and before it is closed, substantially as and for the purpose shown and set forth.

In testimony that I claim the foregoing as my own I have hereunto affixed my signature in presence of two witnesses.

ALFRED EDWARDS.

Witnesses:
 JNO. C. NORTH,
 CLIFFORD C. CHALKER.